US 7,010,506 B1

(12) United States Patent
Menon et al.

(10) Patent No.: US 7,010,506 B1
(45) Date of Patent: Mar. 7, 2006

(54) CENTRALIZED PROCESS FOR ADDRESSING REQUEST FOR RESOURCE IN A LARGE ORGANIZATION

(75) Inventors: Jai P. Menon, Marietta, GA (US); Donna K. Hodges, Cumming, GA (US); John D. Sess, Woodstock, GA (US)

(73) Assignee: BellSouth Intellectual Property Corp., Wilmington, DE (US)

( * ) Notice: Subject to any disclaimer, the term of this patent is extended or adjusted under 35 U.S.C. 154(b) by 540 days.

(21) Appl. No.: 09/996,845

(22) Filed: Nov. 29, 2001

(51) Int. Cl.
*G06F 17/60* (2006.01)
(52) U.S. Cl. .............................. 705/26; 705/8; 705/37
(58) Field of Classification Search .................. 705/8, 705/1, 26, 39
See application file for complete search history.

(56) References Cited

U.S. PATENT DOCUMENTS

| | | | | |
|---|---|---|---|---|
| 6,101,479 | A * | 8/2000 | Shaw ............................. | 705/8 |
| 6,920,430 | B1 * | 7/2005 | Berton et al. .................. | 705/26 |
| 2002/0052797 | A1 * | 5/2002 | Maritzen et al. .............. | 705/26 |
| 2002/0152106 | A1 * | 10/2002 | Stoxen et al. .................. | 705/8 |
| 2002/0165819 | A1 * | 11/2002 | McKnight et al. ............ | 705/39 |
| 2002/0194045 | A1 * | 12/2002 | Shay et al. ..................... | 705/8 |
| 2003/0065573 | A1 * | 4/2003 | Nagel et al. ................... | 705/26 |
| 2003/0097296 | A1 * | 5/2003 | Putt .............................. | 705/11 |

OTHER PUBLICATIONS

Corbitt, Terry, "The Net Works" Credit Management, PP:34-35 Sep. 2001 Dialog file 15 #02218645.*
Mejabi, Olugbenga, "An Exploration of Concept in System Integration" Integrated Manufacturing Systems, v5n4,5, PP: 5-12 1994 File15 #00952033.*
Business Wire "Concur Technologies Ups the Ante on Web Procurrent with Release of CompanyStore 5.0" Business Wire, Mar. 1999 File 20 #04793321.*

* cited by examiner

*Primary Examiner*—Lynda Jasmin
(74) *Attorney, Agent, or Firm*—Potomac Patent Group PLLC

(57) ABSTRACT

A centralized agent of an organization receives a request for the resource from at least one of the entities thereof, and reviews each request for the resource. A vendor capable of supplying the resource is then selected. The agent designates an organization individual to work with the vendor, and the agent and individual produce a qualified request to be submitted to the vendor. Agreement is then obtained with the vendor regarding terms, and the agent reviews and approves same. The selected vendor thereafter develops and supplies the resource. The agent reviews vendor progress according to the agreement.

13 Claims, 4 Drawing Sheets

CENTRALIZED PROCESS FOR ADDRESSING REQUEST FOR RESOURCE IN A LARGE ORGANIZATION

FIELD OF THE INVENTION

The present invention relates to a centralized process for addressing a request for a resource by an entity within a relatively large organization. More specifically, the present invention relates to such a process wherein the requested resource is provided by at least one partner and is applicable to other entities that may request the same resource.

BACKGROUND OF THE INVENTION

A large organization such as a large corporation may have many constituent entities, including divisions, groups, sectors, wholly and partially owned subsidiaries, local office units, etc. Moreover, each constituent entity may require resources as part of the continuing operation thereof. Such resources are many and varied, and for example include office furniture, office supplies, vehicles, raw materials, computer equipment, and computer software. Especially with regard to computer software, such resources can include standardized software applications and specialized software applications.

With regard to any of the aforementioned resources, and with regard to specialized software applications in particular, it is oftentimes the case that more than one entity with an organization requires the same specific resource, and yet each entity acquires such same specific resource from a different vendor at a premium price. Worse yet, and is oftentimes the case with a resource such as a specialized software application, the premium price charged by Vendor A to Entity A is based in large part on the cost charged by Vendor A to Entity A to develop the resource, and likewise the premium price charged by Vendor B to Entity B is based in large part on the cost charged by Vendor B to Entity B to develop the same resource. Quite evidently, the organization is paying twice to develop the same resource for both Entity A and Entity B. Moreover, the problem is exacerbated in the case where many of the entities in an organization are each acquiring resources on their own from many different vendors.

Accordingly, a need exists in connection with a large organization for a centralized resource acquisition process that can receive resource acquisition requests from each of the entities within the organization, assess the requests with regard to a particular resource, and select at least one particular favored vendor to supply the particular resource to all of the requesting entities within the organization.

SUMMARY OF THE INVENTION

The present invention satisfies the aforementioned need by setting forth a method for acquiring a resource for at least one of the entities of an organization. In the method, a centralized agent of the organization receives a request for the resource from at least one of the entities, and reviews each request for the resource. A vendor capable of supplying the resource of the request to the organization is then selected. The centralized agent designates at least one individual from the organization to work with the selected vendor in developing and supplying the resource of the request.

The centralized agent and the designated individual then produce a qualified request to be submitted to the selected vendor and submit the qualified request to the selected vendor. An agreement is then produced with the selected vendor regarding terms by which the selected vendor agrees to supply the resource of the qualified request to the organization. The centralized agent reviews the produced agreement in view of the request and approves same, and the selected vendor thereafter undertakes to develop and supply the resource of the qualified request according to the approved agreement. The centralized agent reviews the progress of the selected vendor according to the produced and approved agreement.

BRIEF DESCRIPTION OF THE DRAWINGS

The foregoing summary as well as the following detailed description of the present invention will be better understood when read in conjunction with the appended drawings. For the purpose of the illustrating the invention, there are shown in the drawings embodiments which are presently preferred. As should be understood, however, the invention is not limited to the precise arrangements and instrumentalities shown. In the drawings.

DETAILED DESCRIPTION OF PREFERRED EMBODIMENTS

Figure 1:
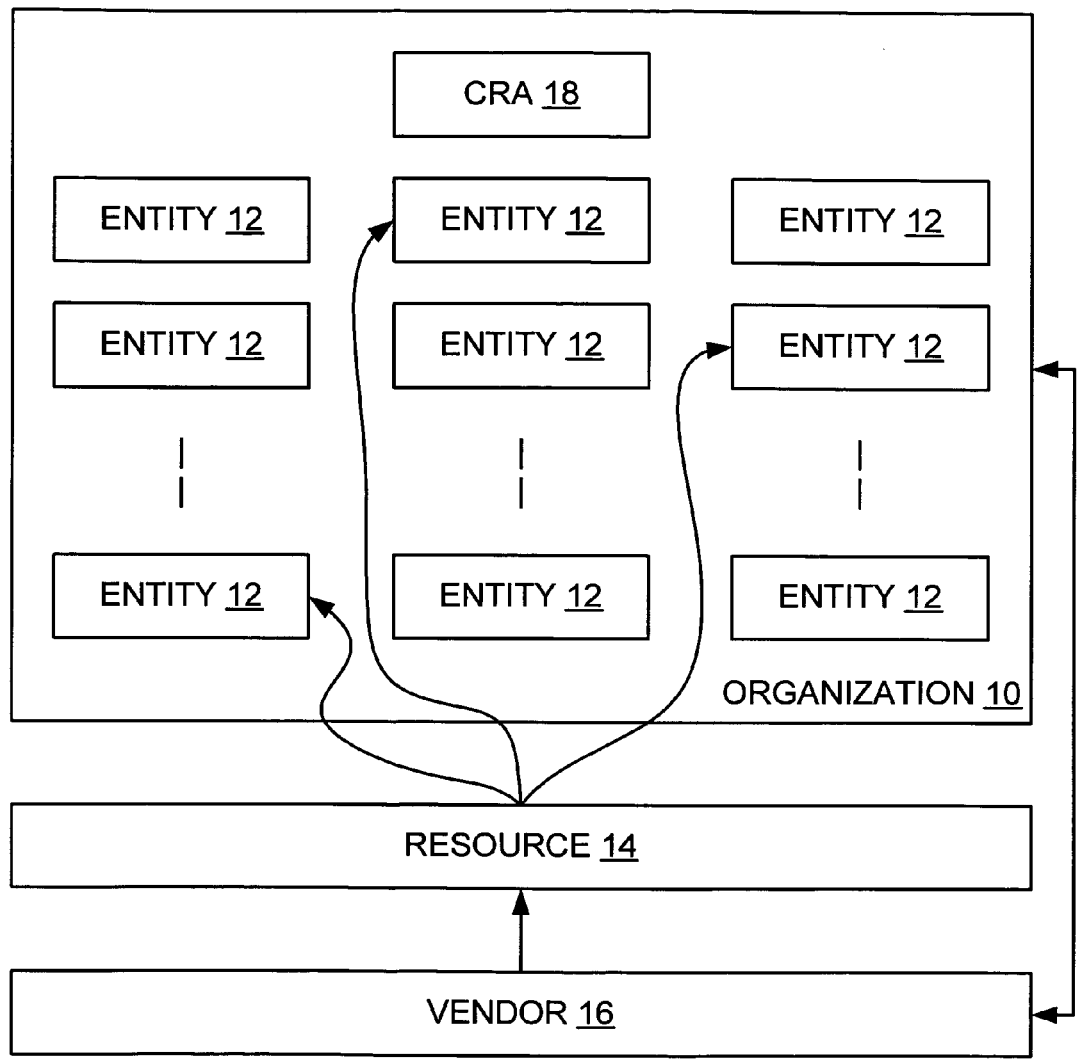
FIG. 1 is a block diagram showing an organization and a centralized resource administrator (CRA) thereof interacting with a vendor to supply a resource to at least one of the entities within the resource.
Figure 2:
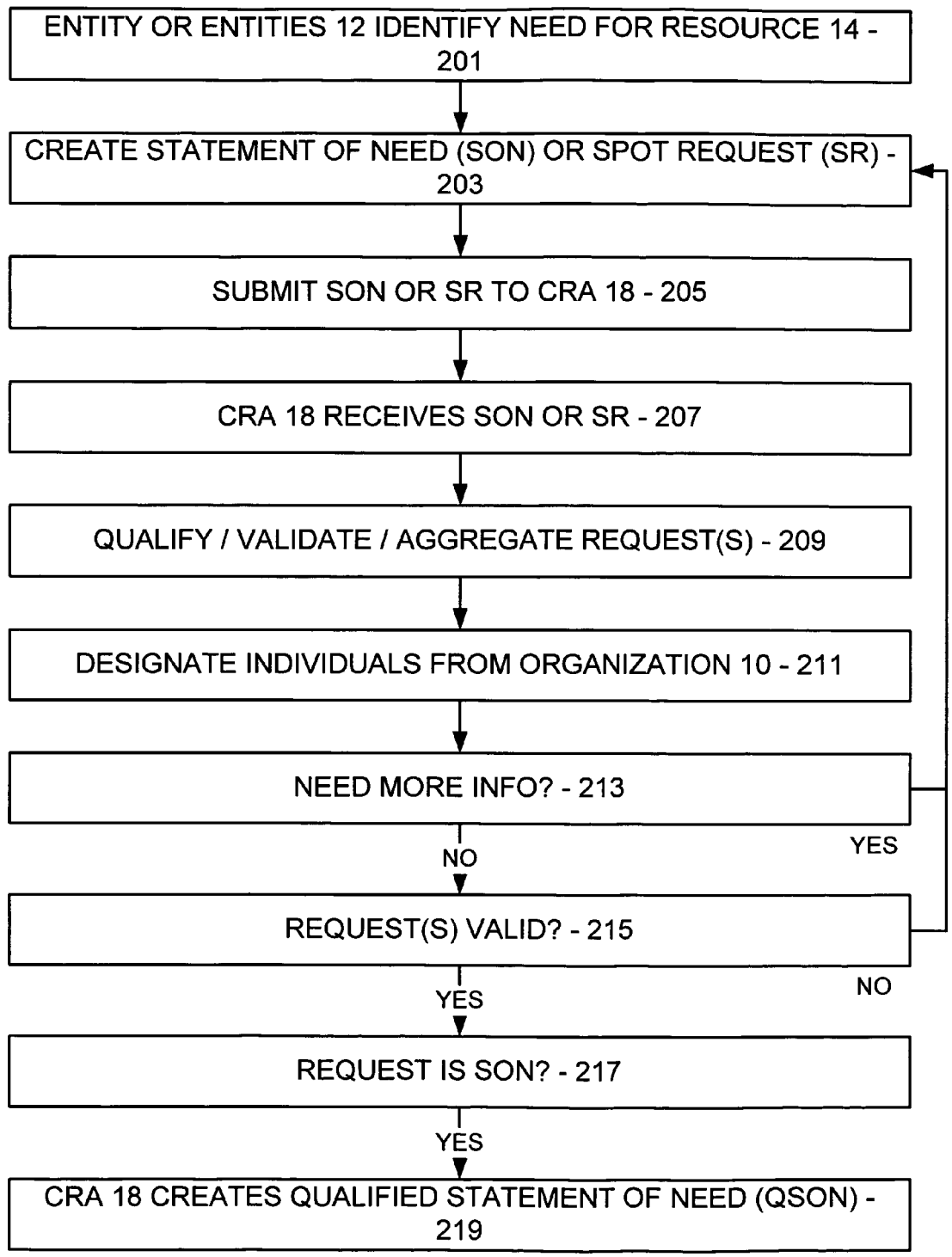
FIGS. 2–6 are flow charts showing steps performed by the entities, the CRA, and the vendor in the course of obtaining resources from the vendor for the entities in accordance with embodiments of the present invention.
Figure 3:
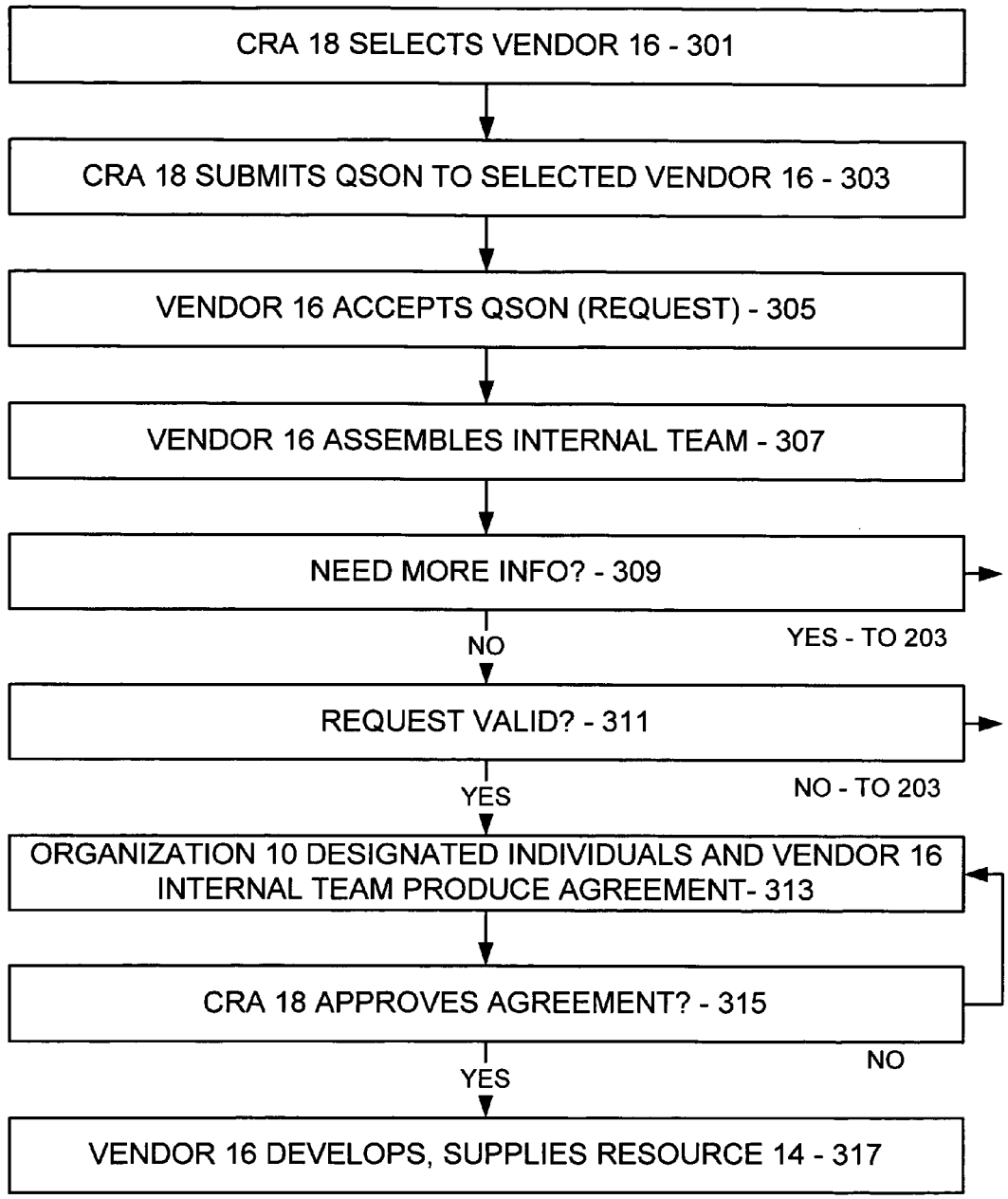
Figure 4:
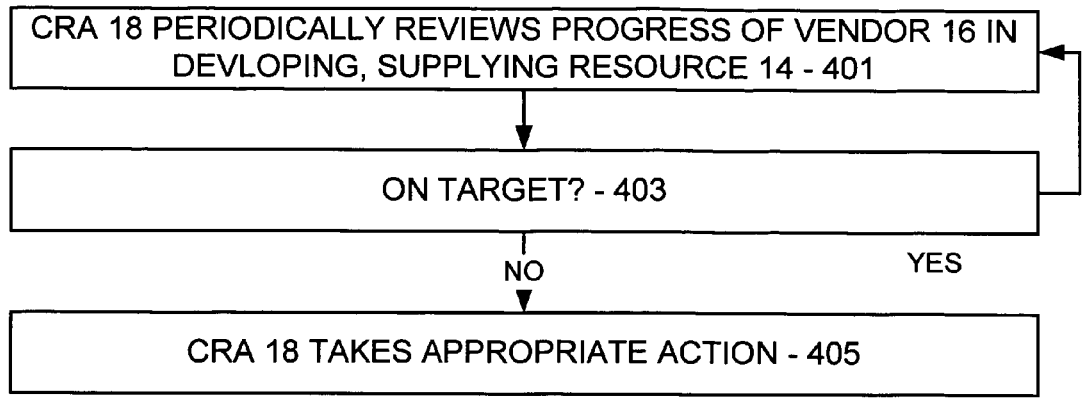
Figure 5:
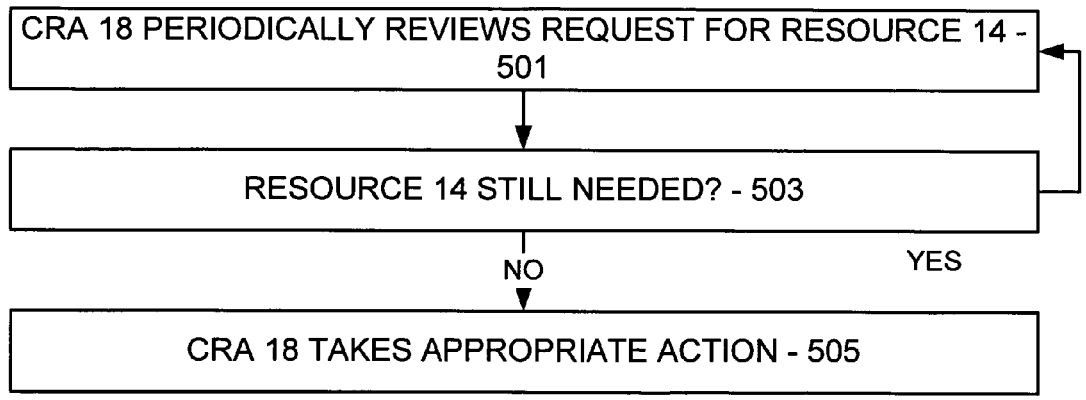
Figure 6:
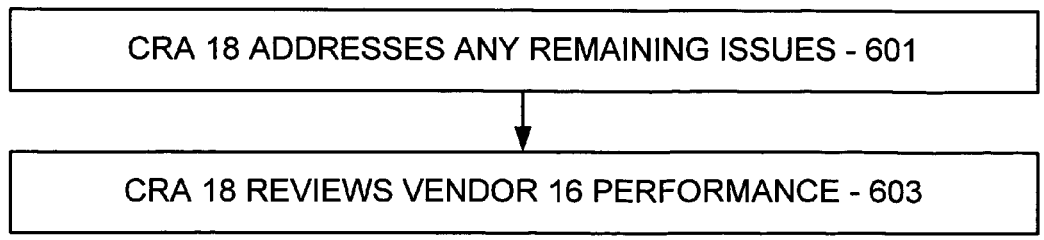

Referring to the drawings in detail, wherein like numerals are used to indicate like elements throughout, there is shown in FIG. 1 a relatively large organization 10 such as a large corporation that has many constituent entities 12, including divisions, groups, sectors, wholly and partially owned subsidiaries, local office units, etc. Note that the organization 10 may have any particular size and any particular organizational structure without departing from the spirit and scope of the present invention.

As may be appreciated, although within the same organization 10 as separate entities 12, at least some of the entities 12 may in fact share common functions. For example, some of the entities 12 may function to sell a particular product or service, but each entity 12 has a particular sales region. Alternatively, some of the entities 12 may function to supply materials to other entities 12, but each entity 12 is responsible for a different material. At any rate, it is likely if not a virtual certainty that at least some of the constituent entities 12 within the organization 10 may require substantially the same resources 14 as part of the continuing operation thereof. Such resources 14 are many and varied and can be any particular resources 14 without departing from the spirit and scope of the present invention. For example, and as was discussed above, the resources 14 can include office furniture, office supplies, vehicles, computer equipment, raw materials, and standardized or specialized computer software. Such resources 14 may also include professional services, training, technical assistance, or the like.

Especially with regard to a specialized software application resource 14, but equally applicable to any other resource 14, a centralized process is employed in one embodiment of the present invention to acquire such resource 14. Accordingly, only one vendor 16 need be dealt with by the organization 10 on a continuing basis with regard to such resource 14. Moreover, the cost of the resource 14 to the organization 10 may be reduced by the one vendor 16 based on the ability of the vendor 16 to amortize development costs in connection with the resource 14 across multiple entities 12. In fact, it may be the case that based on the amount of business to be done with the organization 10, the one vendor 16 may decide to assume the development cost itself in an effort to obtain the business from the organization 10.

In one embodiment of the present invention, and turning now to FIGS. 2–6, the process for acquiring the resource 14 begins at an Initiation phase when at least one entity 12 identifies a need for a resource 14 (step 201), and each entity 12 creates a request for a resource 14 (step 203) and submits the request (step 205) to a centralized agent. Typically, the request is received by a central resource administrator (CRA) 18 (FIG. 1) within the organization 10 (step 207), although the request can be received elsewhere without departing from the spirit and scope of the present invention.

In one embodiment of the present invention, the request as received by the CRA 18 is a statement of need (SON) that includes sufficient information necessary for the CRA 18 to act upon the request. Such information may include but is not limited to a project to which the request is attached, a time frame by which the resource 14 of the request is needed, a priority, an explanation of why the resource 14 of the request is needed, one or more suggested vendors 16, any peripheral requirements (training, technical assistance, etc.), and the like. Note that in the situation where the request is urgent in nature, the request may be received as a spot request (SR) with substantially the same information.

After the Initiation phase, the CRA 18 commences with a Qualification phase in which the received request is reviewed by the CRA 18 and qualified for further action (step 209).

Ideally, the CRA 18 receives multiple requests for the same resource 14 from multiple ones of the entities 12 at about the same time. Accordingly, during the Qualification phase, the CRA 18 aggregates similar requests for concurrent handling. Nevertheless, it is to be appreciated that at times only a single entity 12 may in fact transmit a request for a particular resource 14. Moreover, even if multiple entities 14 do in fact transmit requests for the same resource 14, such request transmissions may in fact be temporally spaced to a degree such that the requests are handled separately. The Qualification phase for any particular request therefore may include a consideration by the CRA 18 of other entities 12 that have not made a similar request but that can be expected to make such a similar request.

The Qualification phase also includes the CRA 18 performing such tasks as acknowledging a received request, scheduling a review of the request with appropriate parties involved, returning a request for clarification if necessary, determining funding, resolving priority issues, and the like. If the CRA 18 determines that any more information is necessary from the requesting entities 12 (step 213), the process returns to the entities 12 so that such entities 12 can modify the created request, as at step 203. Additionally, if the CRA 18 determines for any reason that the request is invalid (step 215), the process also returns to the entities 12 so that such entities 12 can modify the created request, as at step 203. A request may for example be invalid if it is determined by the CRA 18 that the request is for an unnecessary resource 14 or for a resource 14 already supplied by a vendor 16 to the organization.

Significantly, the Qualification phase further includes a selection of one or more vendors 16 capable of satisfying the request and thus able to supply the resource 14 of the request to the organization 10 and the requesting entities 12 thereof (step 301). Note that the CRA 18 may select a vendor 16 based on the vendor 16 suggested in a request, on a bidding procedure, on experience, on a pre-existing relationship between the organization 10 and the vendor 16, or the like.

Moreover, the CRA 18 may select a particular vendor 16 based on the ability to supply all of the requirements of the organization for the resource 14. The selected vendor 16 may be designated as the sole vendor 16 to the organization 10 for the resource 14. Alternatively, if the selected vendor 16 cannot supply all of the resource 14 for the organization 10, other vendors 16 are also selected. Additionally, since it may be unwise to rely on a sole vendor 16, one or more secondary vendors 16 may also be designated to supply the resource 14 for the organization 10.

The Qualification phase still further includes the CRA designating one or more individuals from the organization 10 and/or the requesting entities 12 to work with the selected vendor(s) 16 to develop and/or deliver the requested resource 14 (step 211). The designated individuals typically are from the entities 12 that will be supplied with the resource, and typically have a significant amount of knowledge and familiarity regarding the resource 14 and supplying the resource 14. Note that the designated individuals may also participate in selecting the vendor(s) 16 (step 301). The CRA 18 and the designated individuals then work together to produce a qualified SON or SR (QSON or QSR) request (presuming the request is a SON (step 217)) to be submitted to the selected vendor(s) 16 (step 219). Such QSON or QSR includes but is not limited to a time frame by which the resource 14 of the request is needed, a priority, funding parameters, any peripheral requirements (training, technical assistance, etc.), and the like.

Especially in the case of a resource 14 such as a specialized software application or the like, the selection of a vendor 16 (step 301) is merely a preliminary step. In particular, once the QSON is submitted to the selected vendor(s) 16 (step 303), such selected vendor 16 must then actually be amenable to supplying the requested resource 14, enter into an agreement with the organization 10 to do so, and then actually produce or develop the resource 14 to the satisfaction of the organization 10, the entities 12 thereof, and the CRA 18. Accordingly, in one embodiment of the present invention, the Qualification phase is followed by a Release phase during which the selected vendor 16 and the designated individuals work together to reach agreement regarding the terms by which the resource 14 is to be supplied to the organization 10 and its entities 12.

In particular, the selected vendor 16 after accepting the QSON/request (step 305) assembles an internal team or the like of its own (step 307) and reviews the request. Similar to the CRA 18, if the vendor 16 determines that any more information is necessary from the requesting entities 12 (step 309), the process returns to the entities 12 so that such entities 12 can modify the created request, as at step 203. Additionally, if the vendor 16 determines for any reason that the request is invalid (step 311), the process also returns to the entities 12 so that such entities 12 can modify the created request, as at step 203. A request may for example be invalid from the point of view of the vendor 16 if for example the vendor 16 does not as a matter of course supply such a resource 14, chooses not to supply the resource 14, or cannot supply the resource 14.

Presuming the selected vendor 16 chooses to proceed, such vendor 16 and the designated individuals work together to perform such tasks as clarifying any issues in connection with developing and/or supplying the resource 14, identifying milestones, checkpoints, time frames, and the like that are to be satisfied in developing and supplying the resource 14, identifying any criteria that must be satisfied in developing and supplying the resource 14, etc. As a result of working together, the selected vendor 16 and the designated individuals produce an agreement (step 313) that includes mutually acceptable terms regarding time frames, deliverables, milestones, metric criteria, penalties, etc. Note that in the case of a QSR, which by its nature has a high priority and short lead time, it may not be necessary or even feasible to deliberate over the agreement to the extent that would be expected in connection with a QSON, which by its nature does not have as high a priority or as short a lead time.

Although the CRA 18 need not participate in agreement communications between the selected vendor 16 and the designated individuals, such CRA 18 may do without departing from the spirit and scope of the present invention. At any rate, and assuming that the CRA 18 has not so participated, the CRA 18 reviews the produced agreement in a Governance phase that follows the Release phase. In particular, during such Governance phase, the CRA 18 reviews the produced agreement in view of the QSON or QSR and then decides whether to approve the produced agreement (step 315).

That is, in one embodiment of the present invention, the CRA 18 has the power to accept or deny the produced agreement on behalf of the organization 10. The CRA 18 may in particular deny the produced agreement for any reason without departing from the spirit and scope of the present invention. Reasons for denial, for example, may include cost, terms, failure to satisfy the needs of the organization 10, and the like. In one embodiment of the present invention, the CRA 18 is especially tasked with determining that the resource 14 as supplied by the selected vendor 16 will satisfy the needs of each entity 12 within the organization 10 that requires such resource 14, and not merely some of such entities 12. Accordingly, true economies and efficiencies of scale are obtained.

Presuming that the CRA 18 has in fact approved the produced agreement, the selected vendor 16 develops and supplies the resource 14 according to the agreement and in consultation with and with the approval of the designated individuals from the organization 10 (step 317). In one embodiment of the present invention, as part of the Governance phase, the CRA 18 monitors the progress of the selected vendor 16 according to the terms and conditions of the produced and approved agreement. In particular, the CRA 18 performs a periodic review to monitor that each checkpoint, milestone, deliverable, etc. is complied with according to the approved agreement to ensure that the resource 14 is in fact developed and supplied to the organization on time and within any budget set therefor (step 401). Of course, it may be that a vendor 16 misses a checkpoint or milestone or the like (step 403), in which case the CRA 18 acts to determine whether the resulting delay is justified, and whether the vendor 16 is in danger of failing to develop and supply the resource 14 according to the agreement. In either case, the CRA 18 acts as appropriate (step 405).

Note that during the Governance phase, the CRA 18 may periodically act to re-assess the request(s) for the resource 14 based on the corresponding QSON or QSR (step 501). That is, with the passage of time, it may be the case that a request based on a perceived need is no longer valid because, for example, market conditions have changed, technology has developed differently than expected, etc. The CRA 18 thus determines whether a perceived need and corresponding request are no longer valid (step 503), and if so, the CRA 18 then takes appropriate action to modify or even halt development and production of the resource 14 of the request (step 505).

Finally, once the resource 14 has been developed and supplied, the CRA 18 proceeds to a Closure phase that follows the Governance phase. In such Closure phase, the CRA 18 essentially addresses any remaining issues that need resolving, such as for example payment to the selected vendor 16 (step 601). In addition, the CRA 18 may perform a review of the process, including a review of the selected vendor 16 and perhaps of the designated individuals (step 603). Such review of the selected vendor 16 may for example judge the vendor 16 on timeliness, quality of work, and how the vendor 16 is to be perceived. For example, it may be concluded that the vendor 16 was considered good to work with, in which case the vendor 16 should be considered for developing and supplying other resources 14 to the organization 10 as the need and opportunity arises. Conversely, it may be concluded that the vendor 16 was considered not good to work with, in which case the vendor should not be considered for developing and supplying other resources 14 to the organization 10 unless circumstances dictate otherwise.

As should be understood, the present invention has been described primarily in terms of developing and supplying a resource 14 such as a specialized computer software application to a relatively large organization 10. Nevertheless, and importantly, the present invention is also applicable to any other type of goods or service that may be supplied by a vendor 16, regardless of whether the vendor 16 actually has to develop the resource 14. Accordingly, each other type of goods or service as vended by a vendor 16 may be considered to be within the spirit and scope of the present invention. Also importantly, the present invention is applicable to an organization 10 having any particular size.

Note that the present invention has been disclosed in terms of actions taking place during multiple phases. Importantly, such phases are descriptive only, and are not considered limiting. Thus, an action described in connection with one phase may as circumstances dictate take place in another phase without departing from the spirit and scope of the present invention. Likewise, a phase may take place out of the order described herein as circumstances dictate without departing from the spirit and scope of the present invention.

Note, too, that the present invention may be at least partially implemented by way of a computer system. Such computer system may be any computer system as is necessary and appropriate without departing from the spirit and scope of the present invention. Of course, the present invention may also be implemented substantially without any use of a computer system, also without departing from the spirit and scope of the present invention.

In the foregoing description, it can be seen that the present invention comprises a new and useful process in connection with an organization for performing centralized resource acquisition, where the process can receive resource acquisition requests from each of the entities within the organization, assess the requests with regard to a particular resource, and select at least one particular favored vendor to supply the particular resource to all of the requesting entities within the organization. It should be appreciated that changes could be made to the embodiments described above without departing from the inventive concepts thereof. It should be understood, therefore, that this invention is not limited to the particular embodiments disclosed, but it is intended to cover modifications within the spirit and scope of the present invention as defined by the appended claims.

What is claimed is:

1. A computer-readable medium having stored thereon computer-executable instructions for performing a method in connection with an organization having a plurality of entities, and for acquiring a resource for at least two of the entities comprising:

receiving, at a computerized centralized agent of the organization, a request for the resource from at least two of the entities;

reviewing, by the centralized agent, each request for the resource, such reviewing including:

aggregating substanially the same requests for concurrent handling;

considering other non-requesting entities expected to make a substanially the same request;

determining whether any necessary information has not been provided by the requesting entities in the request, and if so returning the request to the requesting entity for same; and determining whether the request is invalid, and if so returning the request to the requesting entity;

selecting a vendor capable of supplying the resource of the requests to the organization;

designating, by the centralized agent, at least one individual from the organization to work with the selected vendor in developing and supplying the resource of the requests;

producing, by the centralized agent and the designated individual, a single qualified request to be submitted to the selected vendor;

submitting the qualified request to the selected vendor;

producing an agreement with the selected vendor regarding terms by which the selected vendor agrees to supply the resource of the qualified request to the organization;

reviewing, by the centralized agent, the produced agreement in view of the qualified request and approving same, the selected vendor thereafter undertaking to develop and supply the resource of the qualified request according to the approved agreement; and monitoring, by the centralized agent, progress of the selected vendor according to the produced and approved agreement.

2. The medium of claim 1 wherein receiving the request comprises receiving a statement of need that includes information necessary for the centralized agent to act upon the request.

3. The medium of claim 1 wherein selecting the vendor comprises the centralized agent selecting the vendor based on at least one of a suggestion in the request, on a bidding procedure, on experience, on ability to supply the organization for the resource, and on a pre-existing relationship between the organization and the vendor.

4. The medium of claim 1 wherein selecting the vendor comprises selecting a plurality of vendors.

5. The medium of claim 1 comprising designating the at least one individual from an entity that will be supplied with the resource of the request.

6. The medium of claim 1 comprising selecting the vendor by the centralized agent and the designated individual.

7. The medium of claim 1 wherein producing the agreement comprises the selected vendor, the centralized agent, and the designated individual working together to reach agreement regarding such terms.

8. The medium of claim 7 wherein producing the agreement comprises the selected vendor, the centralized agent, and the designated individual defining milestones and criteria that must be satisfied in developing and supplying the resource.

9. The medium of claim 8 wherein monitoring the selected vendor comprises performing a periodic review to determine whether each milestone and criteria is satisfied.

10. The medium method of claim 1 comprising the centralized agent reviewing the produced agreement in terms of a member of a group consisting of cost, terms, ability to satisfy needs of the organization, and combinations thereof.

11. The medium of claim 1 comprising the designated individual consulting with the selected vendor and the centralized agent while the selected vendor develops and supplies the resource of the request.

12. The medium of claim 1 further comprising the centralized agent periodically re-assessing the qualified request for the resource to determine whether the qualified request is still valid in view of whether needs of the organization have changed.

13. The medium of claim 1 further comprising the centralized agent reviewing performance of the selected vendor regarding feasibility of selecting the selected vendor to develop and supply other resources.

* * * * *